United States Patent [19]

Dekker

[11] Patent Number: 4,797,788

[45] Date of Patent: Jan. 10, 1989

[54] ELECTRONIC COMPONENT WITH WIRE CONNECTIONS

[75] Inventor: Evert H. L. J. Dekker, Zwolle, Netherlands

[73] Assignee: U.S. Philips Corporation, New York, N.Y.

[21] Appl. No.: 57,844

[22] Filed: Jun. 3, 1987

[30] Foreign Application Priority Data

Jun. 24, 1986 [NL] Netherlands ........................ 8601640

[51] Int. Cl.⁴ ............................................ H01G 9/00

[52] U.S. Cl. ............................................ 361/540

[58] Field of Search .................... 29/25.42, 569.1, 570; 361/433 T, 433 A, 433 S, 433 C, 433 H, 321, 306, 307

[56] References Cited

U.S. PATENT DOCUMENTS 1,732,158 10/1929 Ford ................................ 361/433 X
2,011,555 8/1935 Burlingame ......................... 361/307
2,769,944 11/1956 Stein et al. .......................... 361/307
2,894,316 7/1959 Genovese ....................... 361/306 X
3,150,301 9/1964 Schils et al. ......................... 361/307
3,345,543 10/1967 Sato ..................................... 361/433
3,516,150 6/1970 Leech ............................ 361/433 X
3,667,002 5/1972 Klein .................................. 361/433
3,819,340 6/1974 Heier et al. ........................ 29/570.1
4,533,931 8/1985 Mundai et al. .................. 361/433 X

*Primary Examiner*—Donald A. Griffin
*Attorney, Agent, or Firm*—Norman N. Spain

[57] ABSTRACT

An electronic component in which connection elements are connected to electrode ends or electrode coatings and which is tightly surrounded by a polymer envelope is considerably reinforced with respect to bending loads on the connections and is less sensitive to the penetration of moisture when at least one of the connection elements, from the connection point, is provided with a loop which first of all extends in a direction substantially opposite to the emanating direction and towards the electronic component and then extends in the emanating direction.

2 Claims, 1 Drawing Sheet

5 4 2 7 9 9 6 10 11 1

ELECTRONIC COMPONENT WITH WIRE CONNECTIONS

BACKGROUND OF THE INVENTION

The invention relates to an electronic component in which connection elements are connected, at connection points, to electrode ends or electrode coatings and which is surrounded tightly by a cured polymer envelope provided by means of a solution or suspension or by means of powder sputtering.

Such a component is an electrolytic capacitor known from U.S. Pat. No. 3,819,340, while an improvement thereof is described in the Dutch patent application No. NL 8403928 (published as No. EP-A-186923) which shows an electrolytic capacitor having a considerably larger effective volume.

In these prior art components the firmness of the connection wires with respect to tensile loads usually is unsatisfactory. Moreover the danger exists that moisture penetrates into the component body along the wire.

SUMMARY OF THE INVENTION

It is the object of the invention to mitigate these disadvantages as much as possible.

According to the invention the component of the type described in the opening paragraph is characterized in that at least one of the connection elements is provided, from its connection point, with a loop which first of all extends in a direction substantially opposite to the emanating direction of the connecting element and towards the electronic component and then extends in the emanating direction of the connecting element.

The expression "substantially opposite to the emanating direction of the connecting element" is to be understood to mean that the loop may enclose an angle of $180^\circ \pm 30^\circ$ with the emanating direction. The connection elements may be wires, but may also be punched strips.

The result of this construction as compared with the known constructions is that the strength with regard to bending load is considerably greater and that the penetration of moisture in the cell is significantly retarded.

DETAILED DESCRIPTION OF THE INVENTION

An important representative of the component to which the invention relates is a dry electrolytic capacitor having an anode body which is punched from aluminum plate, pickled and folded, covered with a dielectric oxide layer by electrolytic oxidation, and which is coated with a layer of a semiconductor oxide, is provided thereon with a conductive layer and is equipped with connection elements at a branch to—or bypass of—the anode lug present at the anode body and the outer conductive layer, respectively.

This embodiment is described in the aforementioned No. EP-A-186923. This branch to—or bypass of—the anode lug is related to the manufacturing technique of the dry electrolytic capacitor, namely to the wetting with the manganese nitrate solution which in a later stage of the manufacture provides the semiconductive manganese oxide. The object of this is to prevent contamination of the anode lug with manganese oxide. As a result of this construction of the lug this embodiment has a considerably better effective volume, or, in order words, a higher capacity per volume unit.

According to a further elaboration hereof the bypass of or the branch at the anode lug are proportioned so that the space therebetween is bridged by the polymer envelope and thus a symmetrical construction with respect to the cathode connection is obtained.

By this proportioning an esthetic disadvantage of the known components is mitigated, namely the not very beautiful asymmetric shape of the components on the side of the connection wires, because the space between the branch of the anode lug and the lower side of the folded packet of the punched aluminum plate upon providing the enveloping laquer produces a reduction in cross-sectional area. In the construction according to the invention load on the connection elements may take place without any objection.

Components are already known, for example, from GB patent specification No. 1 425 958 which are incorporated in a fixed envelope and at least one of the supply wires of which is provided as a loop. The component and the said loop or loops are embedded in a plastic filling material incorporated in the fixed envelope. The object of this construction is to obtain reduced sensitivity to vibrations and consequently this construction is quite different from the invention.

Figure 1A:
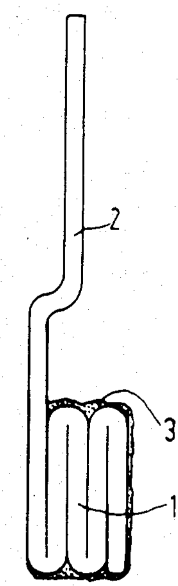
FIGS. 1*a* and 1*b* are respectively side and front elevations of a stage in the manufacture of a dry electrolytic component of the invention.
Figure 1B:
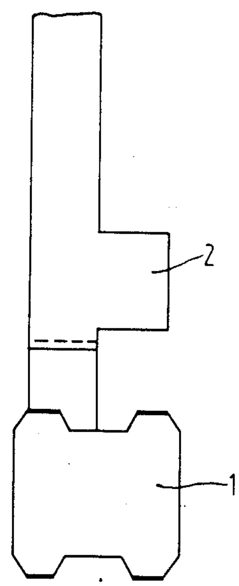
Figure 1C:
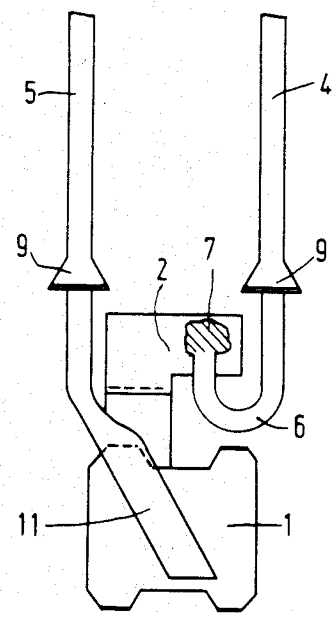
FIG. 1*c* is a front elevation showing an additional stage in the manufacture of a dry electrolytic component of the invention.

The invention will now be described in greater detail with reference to the accompanying drawing in which FIGS. 1*a*, 1*b* and 1*c* show stages in the manufacturing process of an electrolytic capacitor of the invention shown in FIG. 1*d*.

FIGS. 1*a* and *b* show an anode body for a dry electrolytic capacitor, which anode body 1 aluminum is punched from aluminum plate, pickled and folded and provided with a dielectric oxide skin by electrolytic oxidation. The body has an anode lug 2. A series of these anode bodies are connected with their lugs to a strip (not shown), the assembly being punched from one plate of aluminum and in this connection facilitates the transport between the manufacturing steps.

After the electrolytic oxidation the manufacturing process involves the impregnation of the folded anode body with a manganese nitrate solution and heating, pyrolysis of the manganese nitrite occurring whilst forming the semiconductor $MnO_2$. Afterwards a graphite layer and then a silver layer are provided on the anode body.

This assembly of layers is denoted by 3.

In FIG. 1*c* the capacitor body is cut loose from the upper part of the lug and the transport strip. The anode wire 4 with the bend 6 according to the invention is welded to the projection of the lug 2 by means of the welded joint 7. The cathode wire 5, on the side where it is connected to the capacitor body by means of soldering, is flattened over a part of the wire 11. The object of the butt 9 is to stop the lacquer when it is provided. This is necessary in connection with assembly on a printed circuit panel. The butt 9 also serves as an abutment during assembly.

Figure 1D:
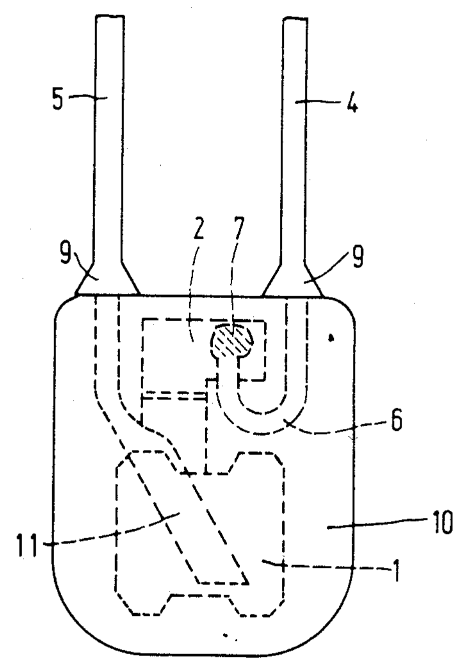
FIG. 1*d* is a front elevation of an enveloped electrolytic capacitor of the invention.

FIG. 1*d* shows the enveloped capacitor which is embedded in the cured polymer mass 10. Suitable polymers for this purpose are inter alia epoxy compounds, for example the diglycydyether of bisphenol A or acrylates.

Other components which according to the invention can be contacted and enveloped are: ceramic disc capacitors and thick-film or thin-film resistors or ceramic linear or non-linear resistors.

What is claimed is:

1. An electronic component in which connection elements emanating from said component are connected at connection points in said component to electrode ends or electrode coatings and which component is surrounded tightly by a cured polymer envelope provided by means of a solution or suspension or by means of powder sputtering, characterized in that at least one of the connection elements is provided, from its connection point, with a loop which first of all extends in a direction substantially opposite to the emanating direction of said connecting element and towards the electronic component and then extends in said emanating direction.

2. An electrolytic capacitor in which connection elements emanating from said capacitor are connected at connection points in said capacitor to electrode ends or electrode coatings and which capacitor is surrounded tightly by a cured polymer envelope provided by means of a solution or suspension or by means of powder sputtering, characterized in that at least one of the connection elements is provided, from its connection point, with a loop which first of all extends in a direction substantially opposite to the emanating direction of said connecting element and towards the electrolytic capacitor and then extends in said emanating direction, in that said electrolytic capacitor has an anode body punched from an aluminum plate, which plate is pickled and folded and provided with a dielectric oxide layer by electrolytic oxidation, which body is covered with a layer of a semiconductor oxide, is provided thereon with an outer conductive layer and is equipped with connection elements, at least one of which connection elements is said connection element provided with a loop, at a branch to, or a bypass from, an anode lug present at the anode body and at the outer conductive layer, respectively, and in that the branch to, or the bypass from, the anode lug and the loop in the connection element on the anode lug are proportioned so that the space therebetween is bridged by the polymer envelope and thus a symmetrical construction with respect to the cathode connection is obtained.

* * * * *